May 7, 1929.  W. F. HACKETT  1,712,144
CULINARY APPLIANCE
Filed Nov. 21, 1927   3 Sheets-Sheet 1

INVENTOR
W. F. Hackett
By Cooper, Kerr & Dunham
ATTYs

May 7, 1929.  W. F. HACKETT  1,712,144
CULINARY APPLIANCE
Filed Nov. 21, 1927  3 Sheets-Sheet 2
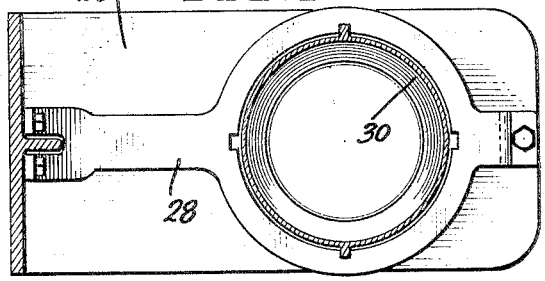
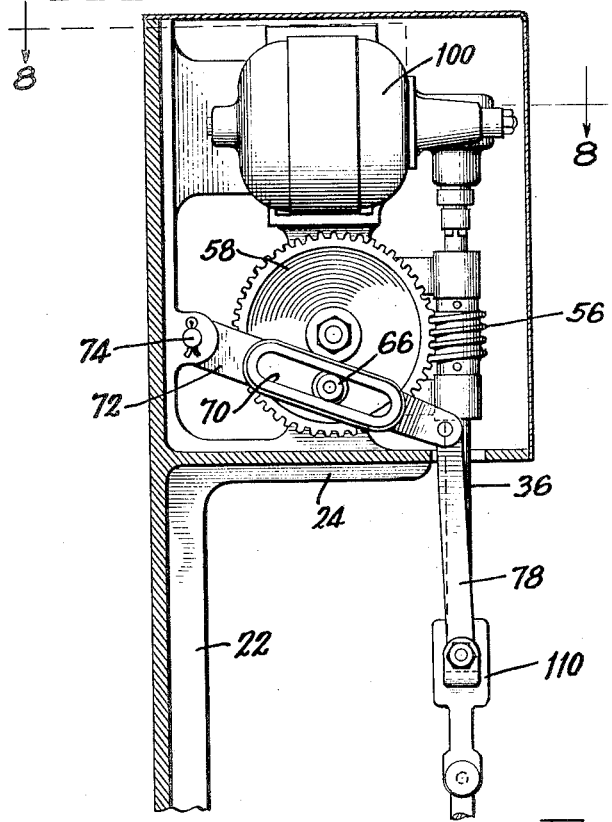
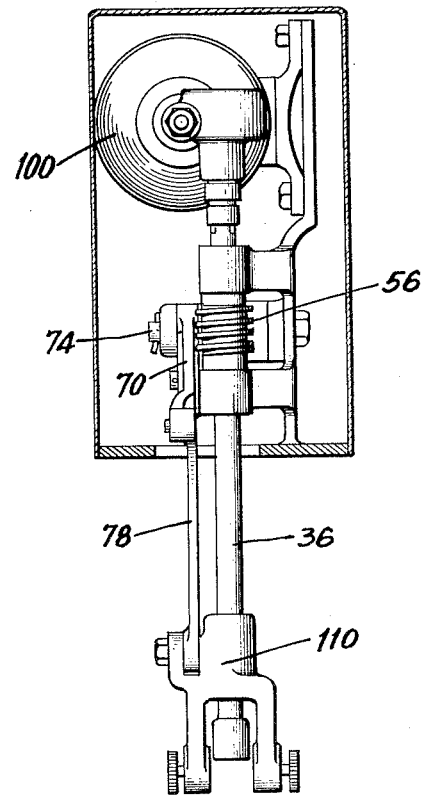
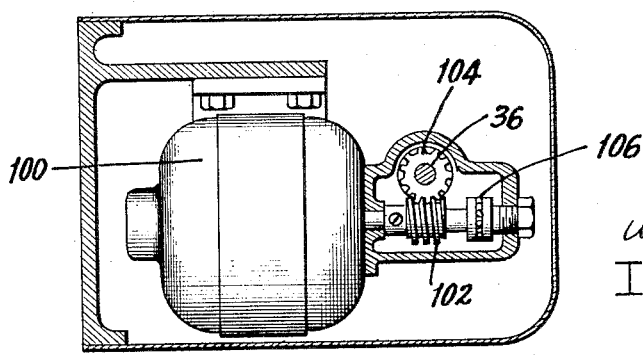
W. F. Hackett
INVENTOR
By Cooper, Kerr & Dunham ATTYs May 7, 1929.  W. F. HACKETT  1,712,144
CULINARY APPLIANCE
Filed Nov. 21, 1927   3 Sheets-Sheet 3

W. F. Hackett
INVENTOR

By Cooper, Kerr & Dunham ATTYs

Patented May 7, 1929.

1,712,144

UNITED STATES PATENT OFFICE.

WILLIAM F. HACKETT, OF NEW YORK, N. Y.

CULINARY APPLIANCE.

Application filed November 21, 1927. Serial No. 234,607.

This invention pertains to a culinary appliance especially adapted for mixing, beating, or otherwise preparing food for use on the table.

The machine is designed to handle the great variety of work found in the kitchen of an ordinary home, and the principal object of the invention, therefore, is to disclose an appliance especially adapted for such conditions.

As is necessary in service of that kind, under unskilled operation, the machine is simple, so as to be easily understood; substantial in order to withstand severe service or abuse without failure; of such design as to be moderate in cost; and, most important, it is capable of performing a wide variety of work with the minimum of manipulation or adjustment.

Further and other objects and advantages will be hereinafter set forth in the accompanying specification and claims, and shown in the drawings, which by way of illustration show what is now considered to be the preferred embodiment of the invention.

Fig. 5 is a cross-section on the line 5—5 of Fig. 1.

Fig. 6 is a side view of a modified form of the machine, partly in section.

Fig. 7 is a view of Fig. 6 from the right, partly in section.

Fig. 8 is a cross-section on the line 8—8 of Fig. 6.

Figure 1:
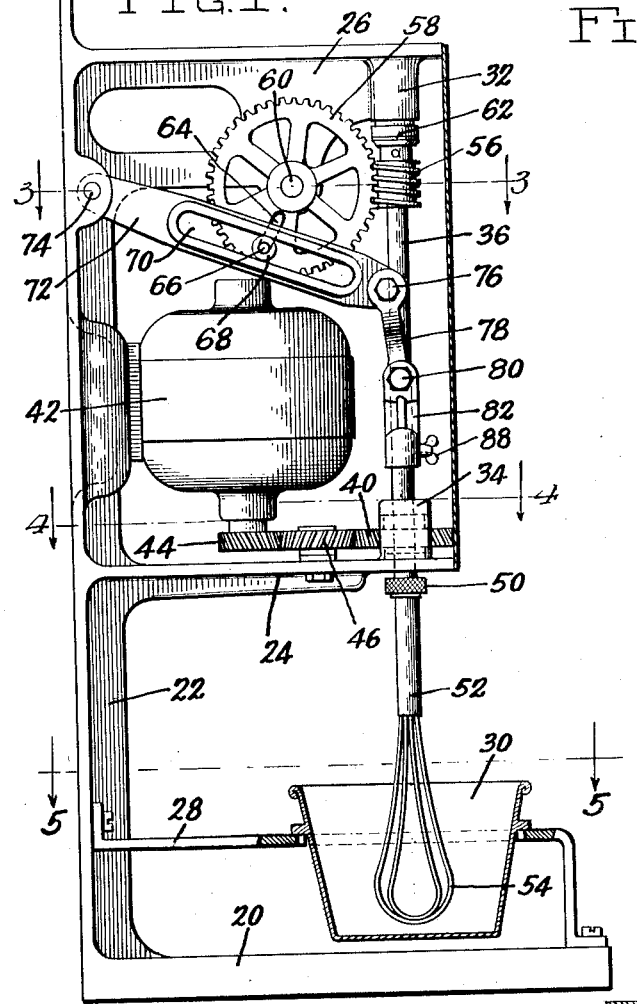
Fig. 1 is a side view, partly in section, of the preferred form of the machine when arranged for driving a rotating tool.

The frame of the machine comprises a base plate 20, an upright portion 22, a shelf 24 integral with upright 22, and a head portion 26. Attached to base 20 is a frame 28 arranged to properly support a bowl 30 in which the material to be treated is placed.

Supported for rotation in bearings 32 and 34 is a vertical shaft 36. Bearing 32 is in head 26, while bearing 34 is part of an arch-like member 38 supported on shelf 24.

Fast on shaft 36 underneath arch 38 is a gear 40. Mounted on upright frame member 22 is a vertical motor 42 on the shaft of which is a pinion 44, which, through an idler gear 46, drives gear 40 to rotate shaft 36.

The lower end of shaft 36 is provided with a manually operable chuck 50 for the purpose of holding the stem 52 of a rotary tool such as the beater 54 shown in Fig. 1. Whenever the motor is in operation shaft 36 rotates, and with it will rotate any tool or device held in chuck 50.

Secured to the upper end of shaft 36 below bearing 32 is a worm 56, in mesh with a worm gear 58 on horizontal shaft 60. A ball thrust bearing 62 is located between worm 56 and bearing 32. Set into a slot 64 in the side of gear 58 is a crank pin 66 upon which is a roller 68. Slot 64 is provided to permit changing the radial position of pin 66 on the gear.

As gear 58 rotates, roller 68 travels in slot 70 in lever 72, which is fulcrumed at 74, with the result that lever 72 oscillates about point 74, the free end of lever 72 traveling up and down in the arc of a circle centered at 74. The length of the arc may be varied by changing the location of pin 66 in slot 64. With such an arrangement lever 72 will travel much more rapidly in one direction than in the other. For instance if gear 58 is rotating at constant speed in the direction shown by the arrow, the up-stroke of the lever will be the faster because the crank pin 66 is then nearer the fulcrum 74. This provides a slow working stroke and quick return stroke for reciprocating appliances. If the direction of rotation of the motor is reversed the down-stroke of the arm 72 will be fast and the up-stroke slow.

Figure 2:
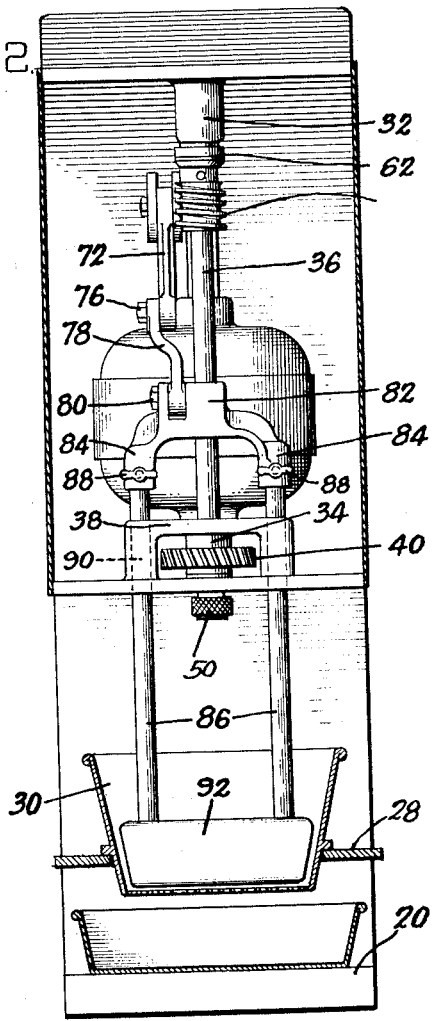
Fig. 2 is a view of Fig. 1 from the right, but with a reciprocating implement in operative position instead of the rotary tool of Fig. 1.
Figure 3:
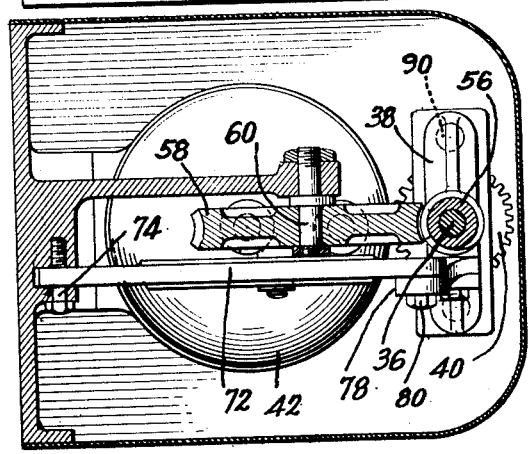
Fig. 3 is a cross-section on the line 3—3 of Fig. 1.
Figure 4:
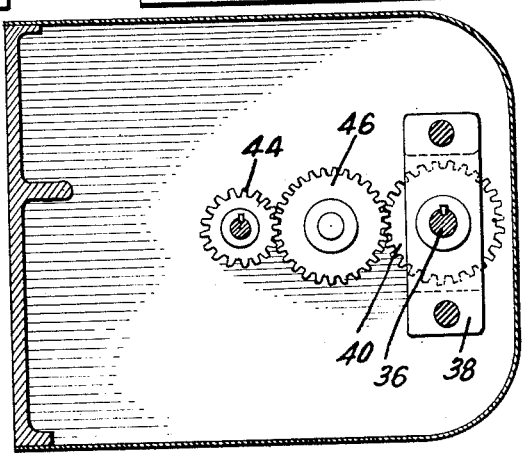
Fig. 4 is a cross-section on the line 4—4 of Fig. 1.

Depending from pin 76 in the free end of lever 72 is a link 78, the lower end of which is attached by pin 80 to a cross-head 82 arranged to slide vertically on shaft 36. Cross-head 82 is provided with two downwardly opening sockets 84 each adapted to receive the upper end of a vertical rod 86. Wing nuts 88 serve to hold the rods in the sockets. The rods pass through vertical guide holes 90 in arch 38, as will be understood from Fig. 2. Attached to the lower ends of rods 86 is any reciprocally operable device such as the potato-masher 92 shown in Fig. 2.

With the above description in mind the operation of the machine will be readily understood.

Assuming that the machine has neither a rotary nor a reciprocating appliance in operative position, and that the operator wishes to use a rotary tool, he simply locks the stem 52 of the tool in chuck 50 and starts the motor. Tool 54 will rotate in bowl 30 and cross-head 82 will move idly up and down on shaft 36. If the operator wishes to use a reciprocating tool he removes stem 52 from chuck 50 and inserts rods 86 of the reciprocating device into sockets 90 and tightens thumb screws 88. Then when the motor is started, tool 92 will move up and down, cross-head 82 being guided for vertical movement by shaft 36, while rods 86 are guided by guides 90. It will be understood that bowls 30 may be changed to best suit the work to be done.

The modification shown in Figs. 6, 7 and 8 is in its main features the same as above described, and the same reference numerals are applied to many of the parts. The principal difference pertains to the use of a horizontal type of motor 100 in place of the vertical type 42 in Figs. 1 to 4. The motor shaft is provided with a worm 102 which drives worm gear 104 fast on the upper end of shaft 36 (Fig. 8). A thrust bearing 106 takes the thrust of the worm.

Cross-head 110 differs from cross-head 82 only in shape, and method of holding the tool, as will be readily apparent.

Figure 9:
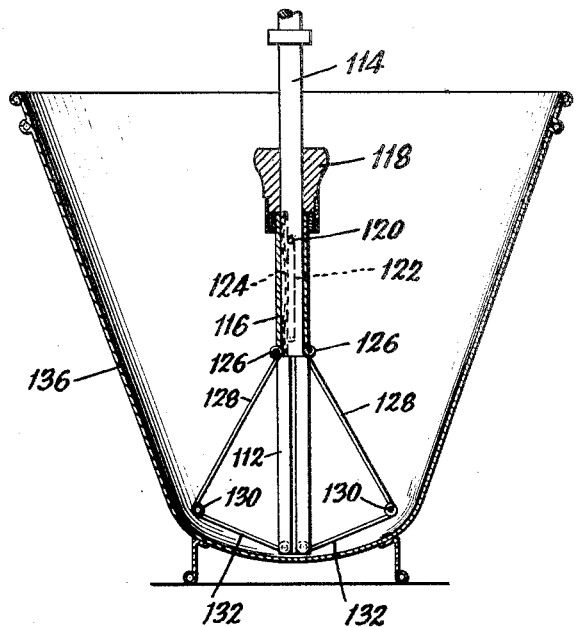
Fig. 9 is a side view, partly in section, of an improved beater for use with the machine.
Figure 10:
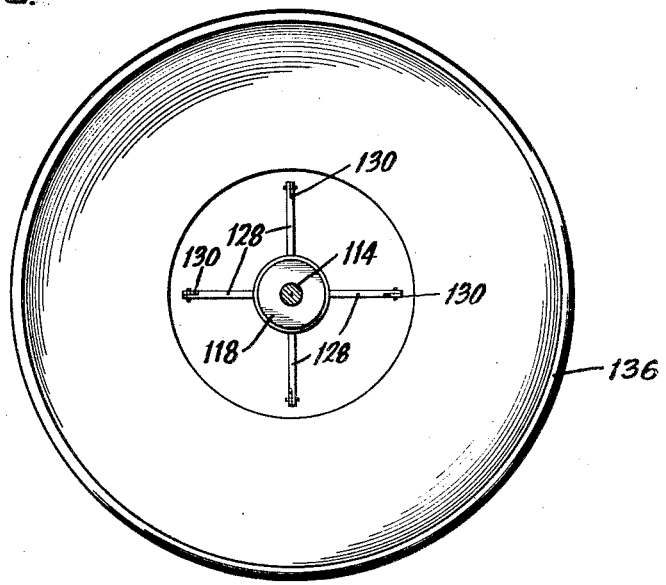
Fig. 10 is a cross-section on the line 10—10 of Fig. 9.

Figs. 9 and 10 show an improved type of rotary beater which may be adjusted in operative diameter at the will of the operator, either while the machine is stationary or in operation. The lower portion 112 of rotary stem 114 is of enlarged diameter, and the enlarged portion is slotted on four sides throughout its length. Above enlarged portion 112 is a sleeve 116 provided at its upper end with a knob or handle 118 by which the operator may slide sleeve 116 vertically on stem 114. Sleeve 116 is prevented from turning on stem 114 by pin 120 fast in the stem and engaging a vertical slot 122 in the sleeve. A spring device 124 set into a slot in stem 114 and bearing against the inside of sleeve 116 serves to frictionally retain the sleeve in any vertical position at which it may be set.

Sleeve 116 is provided at its lower end with four ears 126, each located directly above one of the slots in section 112 of the stem. In each ear 126 is pivoted the upper end of a beater link 128. The lower end of each link 128 is pivotally connected at 130 to a lower link 132, which in turn is pivoted at 134 in the lower end of a slot in shaft 112.

When sleeve 116 is in its lowest position, resting on the top of 112 as in Fig. 9, the outer ends of links 128 and 132 are held at the greatest possible distance from shaft 112 and the beater has a comparatively large operative diameter, thereby extending almost completely across the bottom of bowl 136. When sleeve 116 is positioned at a higher point on stem 114, links 128 and 132 will be drawn closer to shaft 112 and the diameter of the tool will be reduced accordingly.

It is to be understood that the invention is not limited to the construction herein specifically illustrated but can be embodied in other forms without departure from its spirit as defined by the following claims.

I claim—

1. In a culinary appliance of the class described, in combination, a shaft, means for rotating said shaft, a rotary food beating tool, a holder for said beating tool, a reciprocatory food mashing tool, a holder for said reciprocatory mashing tool, and means for operatively connecting said holders to said shaft whereby the holder for said rotary tool may be rotated and the holder for the reciprocatory tool may be simultaneously reciprocated in order that the operator may selectively use either tool.

2. In a culinary appliance of the class described, in combination, a vertical shaft, means for attaching a rotary tool to the end of said shaft, means for rotating said shaft to actuate said tool, a reciprocatory tool, means for actuating said reciprocatory tool, and means comprising said vertical shaft for guiding said reciprocatory tool during the actuation thereof.

3. In a culinary appliance of the class described, in combination, a vertical shaft, means for attaching a rotary tool to the end of said shaft, means for rotating said shaft to actuate said tool, a cross-head arranged to slide on said shaft and adapted to hold a reciprocatory tool, and means for reciprocating said cross-head on said shaft.

4. In a culinary appliance of the class described, in combination, a vertical shaft, a gear driven by said shaft, a crank pin on said gear, a lever, and a reciprocatory tool; said tool being connected to said lever and guided by said shaft for up and down reciprocation; and said lever being arranged for actuation by said crank pin to move said tool more rapidly in one direction than in the other direction, substantially as set forth.

5. In a culinary appliance of the class described, in combination, a mashing implement, means for guiding said implement for vertical reciprocatory motion, means for reciprocating said implement to provide a working stroke and a return stroke, said reciprocatory means operating to move said implement more rapidly on one stroke than on the the other stroke, said guiding means comprising a vertical shaft which also serves to drive said reciprocating means.

6. A culinary food-working machine for mashing, mixing, beating, and like operations, comprising in combination, a vertically depending means for receiving and rotating a non-reciprocatory rotary food-working tool, means supporting said first mentioned means for rotation and preventing reciprocation while rotation is effected, a motor, operative connections for rotating said first mentioned means by said motor, reciprocatory means for actuating a different food-working tool with a slow working stroke and a fast return stroke, and operative connections for driving said last mentioned means by said motor, said first and second mentioned operative connections embodying elements in common.

7. A culinary food-working machine for mashing, mixing, beating, and like operations, comprising in combination, a vertically depending means for receiving and rotating a non-reciprocatory rotary food-working tool, means supporting said first mentioned means for rotation and preventing reciprocation while rotation is effected, a motor, operative connections for rotating said first mentioned means by said motor, reciprocatory means for actuating a different food-working tool, means for adjusting the stroke of said reciprocating tool, and operative connections for driving said last mentioned means by said motor, said first and second mentioned operative connections embodying elements in common.

8. A culinary food-working machine for mashing, mixing, beating, and like operations, comprising in combination, a vertically depending means for receiving and rotating a non-reciprocatory rotary food-working tool, means supporting said first mentioned means for rotation and preventing reciprocation while rotation is effected, a motor, operative connections for rotating said first mentioned means by said motor, reciprocatory means for actuating a different food-working tool, and operative connections for driving said last mentioned means by said motor, said first mentioned means serving to guide and support said last mentioned tool for reciprocation.

9. In a culinary appliance of the class described, in combination, a vertical shaft, means for attaching a rotary tool to the end of said shaft, means for rotating said shaft to actuate said tool, a reciprocatory tool, means for actuating said reciprocatory tool, and means comprising said vertical shaft for guiding said reciprocatory tool during the actuation thereof, said vertical shaft also serving to drive said actuating means.

10. In a culinary appliance of the class described, a rotary beater tool comprising in combination, a vertical shaft, a sleeve on said shaft and manually settable longitudinally thereon, a plurality of beater arms radially projecting from and operatively interconnected with said shaft and said sleeve whereby the extent of radial projection of said arms may be varied by changing the setting of said sleeve on said shaft, and a resilient device for automatically holding said sleeve in any set position.

11. In a culinary appliance of the class described, in combination, a shaft, means for rotating said shaft, a holder for a rotary food beating tool, a reciprocatory food mashing tool, and operative connections actuated by said shaft for reciprocating said mashing tool and simultaneously rotating said holder by said shaft.

12. In a culinary appliance of the class described, in combination, a vertically depending shaft, a holder at the lower end of said shaft to be rotated thereby and adapted to receive a beating tool, a gear secured to said shaft, a second gear meshing with said first mentioned gear, a food mashing tool, means operable by said second mentioned gear for reciprocating said mashing tool, and power means for simultaneously rotating said shaft and second mentioned gear.

In testimony whereof I hereto affix my signature.

WILLIAM F. HACKETT.